United States Patent [19]

Goldmark

[11] 4,045,819
[45] Aug. 30, 1977

[54] VIDEO RECORDER AND PLAYBACK APPARATUS

[75] Inventor: Peter C. Goldmark, Stamford, Conn.

[73] Assignee: Goldmark Communications Corporation, Stamford, Conn.

[21] Appl. No.: 636,316

[22] Filed: Nov. 28, 1975

Related U.S. Application Data

[62] Division of Ser. No. 297,180, Oct. 13, 1972, Pat. No. 3,938,189.

[51] Int. Cl.$^2$ ............................................. H04N 5/79
[52] U.S. Cl. ............................................. 360/8; 360/10; 360/35
[58] Field of Search .................. 360/8, 9, 10, 35; 178/6.6 FS, 6.6 DD, DIG. 35; 358/127

[56] References Cited

U.S. PATENT DOCUMENTS

| | | | |
|---|---|---|---|
| 3,085,130 | 4/1963 | Lemelson | 360/9 |
| 3,715,481 | 2/1973 | Harr | 360/35 |
| 3,789,137 | 1/1974 | Newell | 360/8 |
| 3,934,268 | 1/1976 | Uemura | 360/10 |

Primary Examiner—Raymond F. Cardillo, Jr.
Attorney, Agent, or Firm—St. Onge, Mayers, Steward & Reens

[57] ABSTRACT

An apparatus is described for recording and playing back video frames with associated audio signals for use with a conventional television display. A magnetic loop is employed to store video frames for display with associated audio information being placed as a separate frame on another magnetic medium. A full program of video and audio frames may be received and selected from a remote transmitter and appropriately located on a magnetic medium for sequential display on the television display. A first embodiment uses a cassette tape with a video loop for storage and playback of a program. A second embodiment uses a pair of multiple track belts for program storage and playback. Pilot signals are employed to precisely store the video frames on the video loop and to automatically sequence the display and sound projection of the multiple video and associated audio frames.

11 Claims, 6 Drawing Figures

Fig. 2.

VIDEO RECORDER AND PLAYBACK APPARATUS

This is a division of application Ser. No. 297,180, filed Oct. 13, 1972, now U.S. Pat. No. 3,938,189.

This invention relates to an apparatus for recording and playing back pictures in the form of video frames with related audio signals for use with a television display. More specifically, this invention relates to an apparatus for playing back video and audio frames recorded on magnetic medium such as cassette tapes or belts of tape and the like on a conventional home television receiver.

SUMMARY OF THE INVENTION

In the first embodiment for a video frame and audio narration recording and playback apparatus in accordance with the invention, a program formed of a number of video frames, each of which is followed by an audio narration, is first recorded on a main magnetic tape. During playback, each video frame is first transferred to a magnetic loop. After transfer, the audio narration signals are applied to the audio section of a home TV set and the loop is operated to provide video signals for TV display during the audio narration.

In another embodiment for a video frame and audio narration recording and playback apparatus in accordance with the invention, frames of high carrier frequency video and audio information are directly placed on separate continuous loops of magnetic tape. Each loop is formed of a broad belt for accommodating a large number of tracks with each track on a belt designated to carry a full frame of either video or audio information. During recording of a program, the video and audio signals may be alternately recorded and the recording heads correspondingly automatically sequenced to adjacent tracks to record each frame on a different track. When the information is to be played back, the audio belt is reduced in speed to provide audio narration over an extended time while the video belt operates at a high speed to provide video signals for display on a conventional receiver.

An advantage of the apparatus resides in its ability to select from a variety of programs presented by a conventional TV during low-use periods. The program selection is advantageously automatically executed by utilizing decoding networks which identify the programs transmitted from the TV station. Another advantage resides in the recordation of programs at sufficiently high speeds to enable the TV station to transmit a large number of programs in a relatively short time period. A wide variety of programs can thus be selected. A further advantage resides in a convenient apparatus for storing both audio and video frames on magnetic media such as magnetic belts.

A particularly advantageous feature resides in the transmission of video and audio frames on high frequency modulated carriers. The video and audio frames may be directly recorded on rapidly moving magnetic media such as a tape, belt or disc and, in the case of the audio playback, is played back at a reduced speed. In this manner a half hour program of say 100 frames can be transmitted in a matter of about ten seconds from a central source. Many subscribers can be accommodated with a program of their choice with little waiting time.

It is, therefore, an object of the invention to provide a convenient apparatus for the recording and playback of programs in conjunction with conventional home television receivers. It is a further object of the invention to provide a playback apparatus of programs formed of a plurality of video frames and related audio for use with home television receivers.

DESCRIPTION OF DRAWINGS

These and other advantages and objects will be understood from the following detailed description of a video recording and playback apparatus described in conjunction with the drawings wherein.

Figure 1:
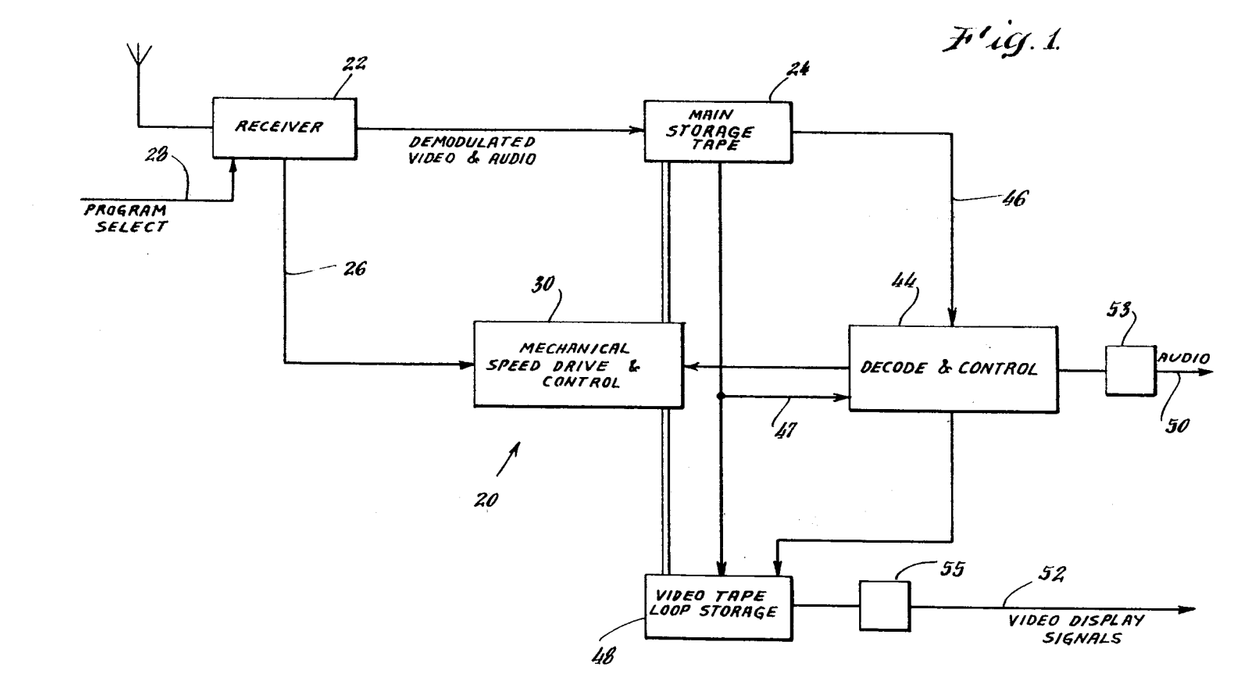
FIG. 1 is a block diagram of a first embodiment for a video recording and playback apparatus in accordance with the invention.
Figure 2:
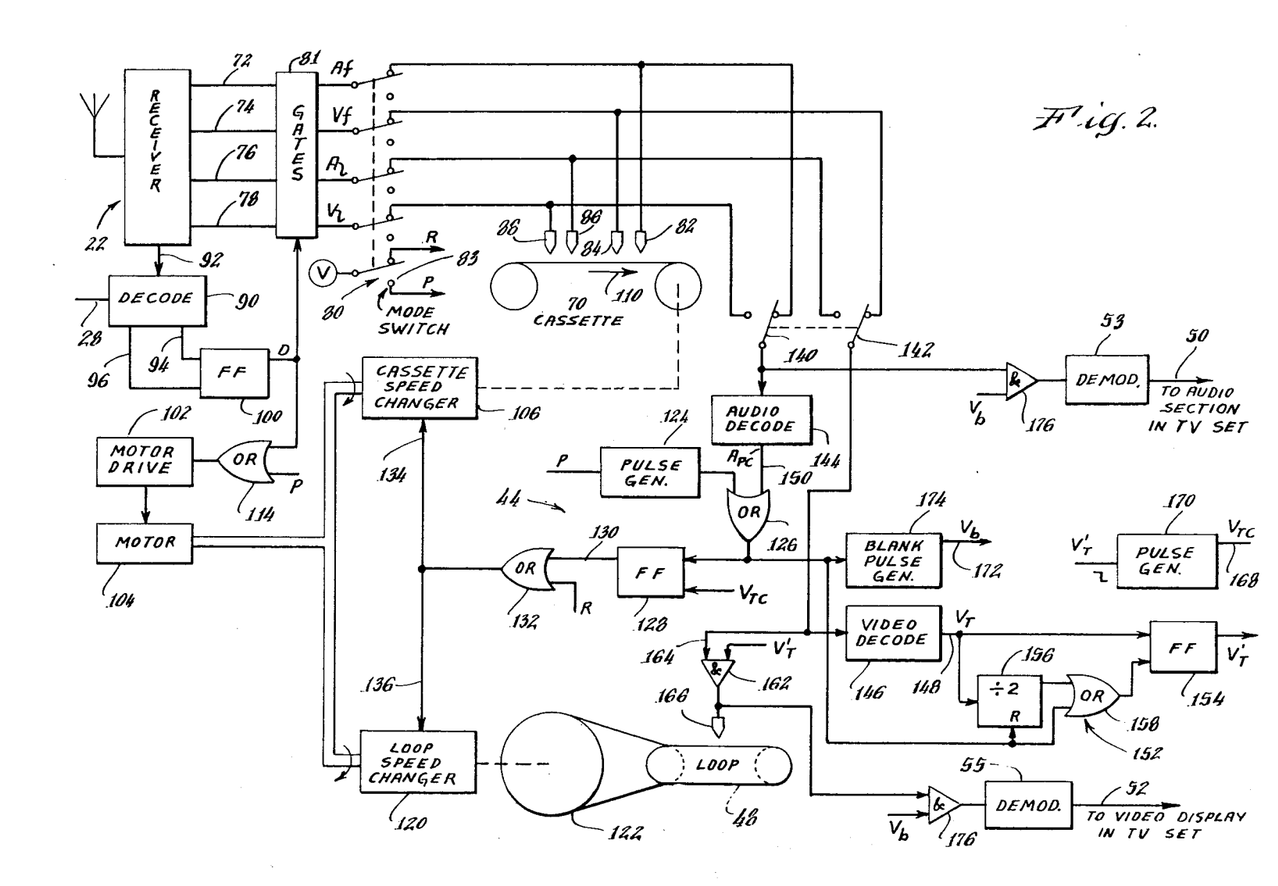
FIG. 2 is a schematic of the apparatus shown in FIG. 1.
Figure 3:
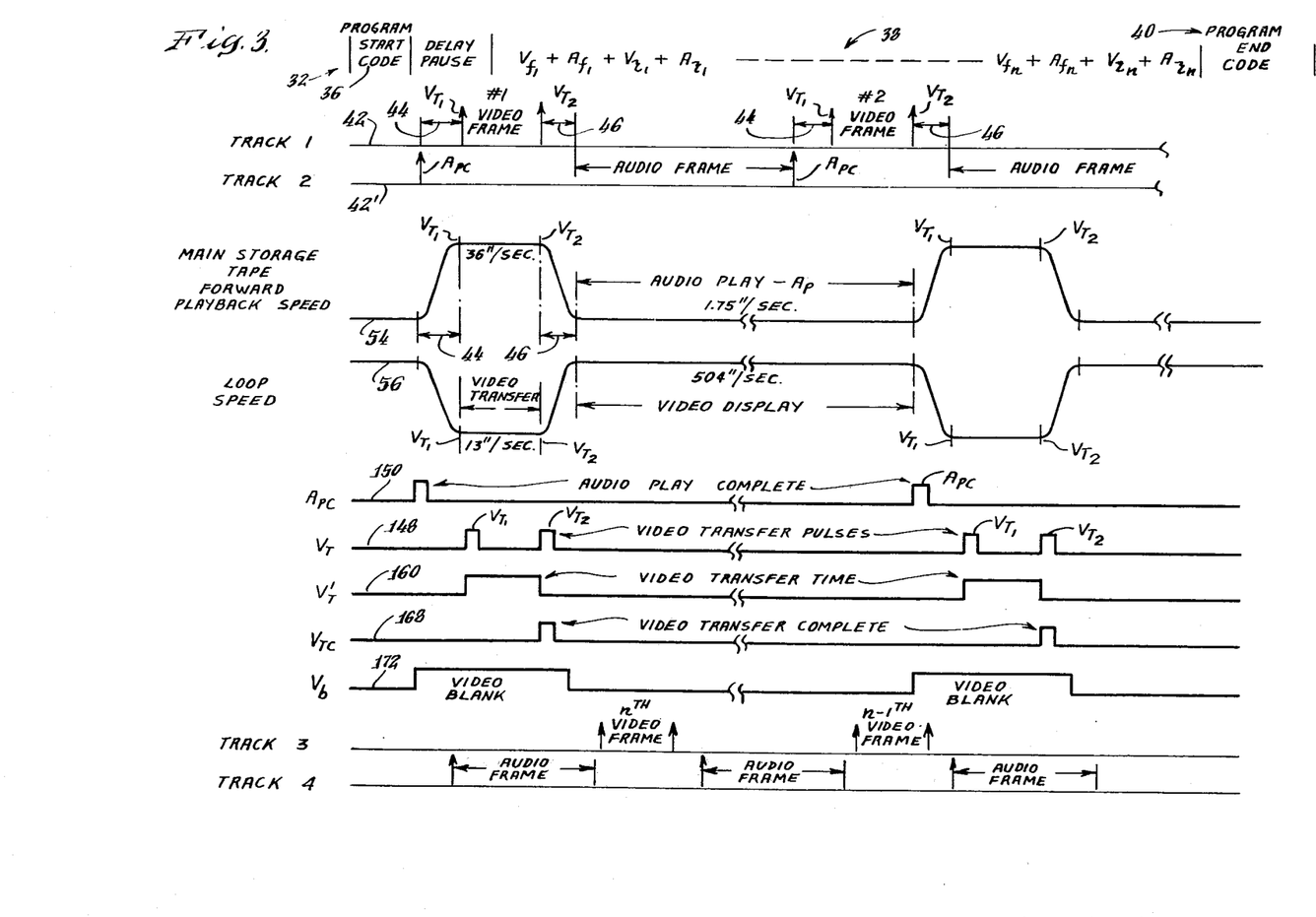
FIG. 3 is a waveform diagram of several signals developed in the apparatus shown in FIG. 2 and a schematic representation of the organization of audio and video signals during transmission.

DETAILED DESCRIPTION OF EMBODIMENT OF FIGS. 1, 2 and 3

With reference to FIG. 1, a video recording and playback apparatus 20 in accordance with the invention is shown, including a receiver 22 wherein composite program signals from a remote TV transmitter (not shown) are detected to produce video and audio signals at a suitable carrier frequency and with the proper modulation for recording on a main storage tape 24. In addition, receiver 22 produces a decoded signal output line 26 indicative of the receipt of a program which had been previously selected by applying input signals on a program select line 28. When a program is recognized and line 26 has been energized, a speed drive mechanism 30 is actuated to commence recording of video and audio signals on main storage tape 24. At the end of the selected program another signal is decoded to terminate the recording mode.

The composition of the signal from the TV transmitter is selected compatible with the desired medium used to transmit the information. This medium may be, for example, a coaxial cable system to very wide bandwidth. The organization of the video and audio signals and their transmission are illustrated on program line 32 in FIG. 3.

Program line 32 is a timing diagram for the composite transmitted program signal from a remote transmitter. Program signal 32 is identified by start code segment 36 formed of a pulsecode modulated carrier. The start code 36 is followed by video and audio information signals 38. An end code 40 follows signals 38 to signify the end of the transmission of the program.

Two carrier frequencies are used to carry alternate video and audio signals V and A. The modulation of each carrier is approximately 200 kHz for an approximate total frequency channel bandwidth of ½ MHz. One carrier frequency carries alternate video and audio signals $V_f$ and $A_f$, designated for the first two tracks of the main storage tape and the other carrier frequency carries alternate video and audio signals $V_r$ and $A_r$ for storage on the other remaining two tracks of the main tape. Since both carriers occur and are recorded simultaneously, the reverse signals $V_r$ and $A_r$ are transmitted in reverse order to accommodate the playback mode.

Both the audio and video signals may be recorded on a single track so that but two tracks are needed for recording. Reverse recording for one of the tracks will still be needed.

Upon completion of the recording of a desired program, apparatus 20 is automatically taken out of its recording mode. At this time the main storage tape 24 carries video and audio signals in a spatial alternate relationship as illustrated with segments 42 and 42' of the main storage tape. The tape's tracks 1 and 2 carry respectively, forward video and audio signals $V_f$ and $A_f$. The video signals include start and finish pilot signals $V_{T1}$ and $V_{T2}$ which define the length of the video frame signal recorded on main tape 24. Each audio signal is followed by a code signal $A_{pc}$ which signifies completion of the audio playback mode. The video and audio frames are further separated from each other with pauses 44, 46 to accommodate speed changes in apparatus 20 as will be further explained. In a typical example, the video frames each occupy about 36 inches of tape length and the audio frames about 48 inches each.

Playback of the video and audio frames from main storage tape 24 is obtained at any desired time under the control of a decode and control network as shown in FIG. 1. Network 44 decodes the several timing signals $V_T$, $A_{pc}$ from input lines 46 and 47 and controls the transfer of video from signals from main storage tape 24 to a video loop 48. Loop 48 may be in the form of a tape belt or a disc. Network 44 further controls the speed changes needed during the playback mode of apparatus 20. Audio and video frame signals for use with a conventional TV home receiver are generated on lines 50, 52 respectively after being converted in demodulators 53, 55 to the proper frequencies.

The playback operation of apparatus 20 may be explained with reference to the timing diagrams 54 and 56 in FIG. 3. Diagram 54 displays the main storage tape speed as a function time and diagram 56 shows the loop speed as a function of time. The playback mode commences with a transfer mode during which the main tape speed is increased to about 36 inches per second and the loop speed is reduced to about 13 inches per second. At this latter speed, one revolution of the loop 48 is provided with video signals which constitute one full video frame.

The actual transfer from tape 24 to loop 48 is delayed for the time duration 44 to allow the proper tape and loop speeds to be established. Transfer is then executed between the time period defined by the $V_{T1}$ and $V_{T2}$ pulses located at respectively the beginning and end of each video frame.

After a video frame has been transferred to loop 48, the main tape speed is reduced to the normal audio playback speed of 1.75 inches per second while the loop speed is increased to about 504 inches per second. After these tape speeds have been attained after pause 46, the audio narration with video frame display commences until the audio play has been completed as evidenced with the audio end code pulse $A_{pc}$. At that time a new frame is transferred and the operation as just described is automatically repeated.

The time period needed to perform the video frame transfer is quite short, being measured in several seconds including pauses 44, 46. This time is a function of the length of tape occupied by a video frame. This length, in turn, is a function of the recording speed and transmission frequencies employed during the record mode. When the transmission frequencies of the video frame signals occupy 200 kHz and a recording speed of 36 inches per second is employed, about 36 inches of main tape length is needed for each video frame. These parameters may be varied to accommodate transmission and equipment variations.

FIG. 2 illustrates a more detailed embodiment for recording audio and video frames in the manner as previously described with reference to FIG. 1. A tape cassette 70 is provided to serve as the main storage tape 24 on which demodulated audio and video frame signals $A_f$, $V_f$, $A_r$, $V_r$ are recorded on four different tracks. Receiver 22 includes appropriate r-f circuitry with which the frame signals are separated and presented on four different output lines 72, 74, 76 and 78. The frame signals are coupled through a mode control switch 80 and an analog logic gate network 81 to respectively different recording and playback heads 82, 84, 86 and 88.

Receiver 22 further includes circuitry to separate the start and end codes 36, 40 (See FIG. 3), which are then applied to a decode network 90. Network 90 has an input 28 for program selection by which the desired program may be extracted from the signals generated by a remote television transmitter (not shown). Decode networks produces a program start signal on output line 94 which effects an opening or enabling of gate 81 and a program end signal on output line 96 to effect a closing of gate 81.

Gate 81 includes four analog-logic AND gates through which the demodulated audio and video signals are passed before reaching heads, 82, 84, 86 and 88. A flip-flop 100 which is set by a program start signal on line 94 and reset by end signal on line 96 provides the enabling pulse for gate 81. Hence, gate control 81 operates to pass only a particular program to cassette 70 which may thus be automatically loaded at any convenient time.

The enabling signal from flip-flop 100 is further applied to a motor drive circuit 102 through an OR gate 114 to energize a motor 104. Motor 104, in turn, is coupled to a cassette speed changer mechanism 106 which drives cassette 70 in a forward direction as indicated by arrow 110.

In the record mode, apparatus 20 is left in an enabled position to await the recognition and arrival of the selected program code. When the program has been recognized, the motor drive 102 is energized and motor 104 is actuated. Cassette 70 attains the required recording speed of 36 inches per second very quickly and before the arrival of the first video transfer pulse $V_{T1}$ and thereafter the remainder of the program is recorded. When the program end code is detected, flip-flop 100 is reset, thus preventing any further signals being recorded and removing the enabling signal to motor 104 for an automatic shut-down. In this manner, the user of apparatus 20 may record video programs automatically and during late night hours when program transmission time is available.

During playback and after rewind (control and apparatus for rewind has been deleted for clarity) switch 80 is moved to actuate terminal 83 and frame signal outputs from receiver 20 are disconnected from heads, 82, 84, 86 and 88. Terminal 83 provides a playback signal O which is applied through OR gate 114 to actuate motor drive 102 to start motor 104 and drive cassette 70 in a forward direction. Motor 104 is connected to loop 48 through a loop speed changer 120 and a belt drive 122.

Playback signal P is further used to initiate a reset of logic circuit in the decode and control network 44 and implement a change in the speeds of cassette 70 and loop 48. The speed change is needed for the transfer of the first video frame from cassette 70 to loop 48. This speed change is obtained by applying the P signal to a pulse generator 124. The output pulse from pulse generator 124 is applied through an OR gate 126 to a flip-flop 128 whose set output line 130, in turn, actuates through OR gate 132 solenoids (not shown) in speed changers 106 and 120.

Speed changers 106, 120 are each provided with a solenoid for changing the speeds of cassette 70 and loop 48 respectively. In the case of the cassette speed changer 106, its solenoid normally is in a position to provide a cassette speed at the audio playback speed of 1.75 inches per second. When a singal from OR gate 132 is applied to input line 134, the cassetts speed is changed to the video transfer speed of 36 inches per second (see also waveform 54 in FIG. 3).

The loop speed changer solenoid normally is in a position to provide an output video display speed of 504 inches per second. When a signal from OR gate 132 is applied to input line 136, the loop speed is decreased to the transfer speed of 13 inches per second (see also waveform 56 in FIG. 3). Note that the record mode switch signal R is also applied to OR gate 132 since the transfer and record speeds of cassette 70 are the same.

While cassette 70 and loop 48 attain their transfer speeds, the audio signals $A_f$ from head 82 and video signal $V_f$ from head 84 are applied through track selection switch 140, 142 to respectively an audio decode network 144 and video decode network 146. The video decode network 146 detects and produces the video transfer pulses $V_{T1}$ and $V_{T2}$ on line 148 (see waveform 148 in FIG. 3) and the audio decode network 144 detects and produces the audio play complete pulse $A_{pc}$ on output line 150 (see waveform 150 in FIG. 3).

A network 152 is further employed to produce a video transfer time pulse $V_T'$ which spans and determines the transfer time of video signals from cassette 70 to loop 48. This $V_T'$ signal is generated by applying the video transfer pulses to both a flip-flop 154 and a divide by two network 156. The second video transfer pulse $V_{T2}$ resets divider 156 and also flip-flop 154. The audio complete pulse $A_{pc}$ and playback mode signal P are also applied to reset divider 156 and through OR gate 158 the flip-flop 154. The $V_T'$ signal, shown as waveform 160 in FIG. 3, is used to enable an analog logic amplifier 162.

Analog logic amplifier 126 has its analog input 164 coupled to the video track switch 142 and drives the loop head 166. Hence, as soon as the first video transfer pulse $V_{T1}$ has been detected, the pulse $V_T'$ enables logic amplifier 162 until the second video transfer pulse $V_{T2}$ has been detected. In this manner, the transfer of video frames from cassette 70 to loop 48 is accurately timed and exactly one single frame recorded on loop 48.

When the second transfer pulse $V_{T2}$ has been detected, a pulse $V_{TC}$ on line 168 from a pulse generator 170 is used to signify completion of the transfer. The $V_{TC}$ pulse is applied to reset flip-flop 128 and permit cassette 70 and loop 48 to attain their normal playback speeds as shown in waveforms 54 and 56 of FIG. 3.

During the transfer mode, it is important that no audio or video signals reach the home television set. For this reason a blanking pulse $V_b$ is produced on output line 172 of pulse generator 174. The blanking pulse is applied to inhibit gates of analog logic gates 176 and 178 to respectively disable the audio narration and video display during the entire transfer period. Note that the blanking pulse is initiated by the $A_{pc}$ pulse at the time that the audio playback has been completed and persists shown with waveform 172 in FIG. 3 through the video transfer mode until the cassette 70 and loop 48 have again attained their playback speeds.

The playback operation of apparatus 20 is thus entirely controlled by codings in the video frame signals $V_{T1}$ and $V_{T2}$ and the audio narration signal $A_{pc}$. The loop length is selected to accommodate signals for a single standard TV frame and thus provides a continuous display through audio narration.

The loading of a forty-five minute cassette is completed in approximately two minutes for all four tracks. Assuming that six programs can be transmitted on a 6 MHz channel, then 180 different programs can be transmitted in one hour. When a separate channel is made available for such program transmission, as can easily be accommodated in a cable TV system, an enormous number of programs can be disseminated. Apparatus 20 is conveniently employed with a main storage tape of the conventional audio tape.

Figure 4:
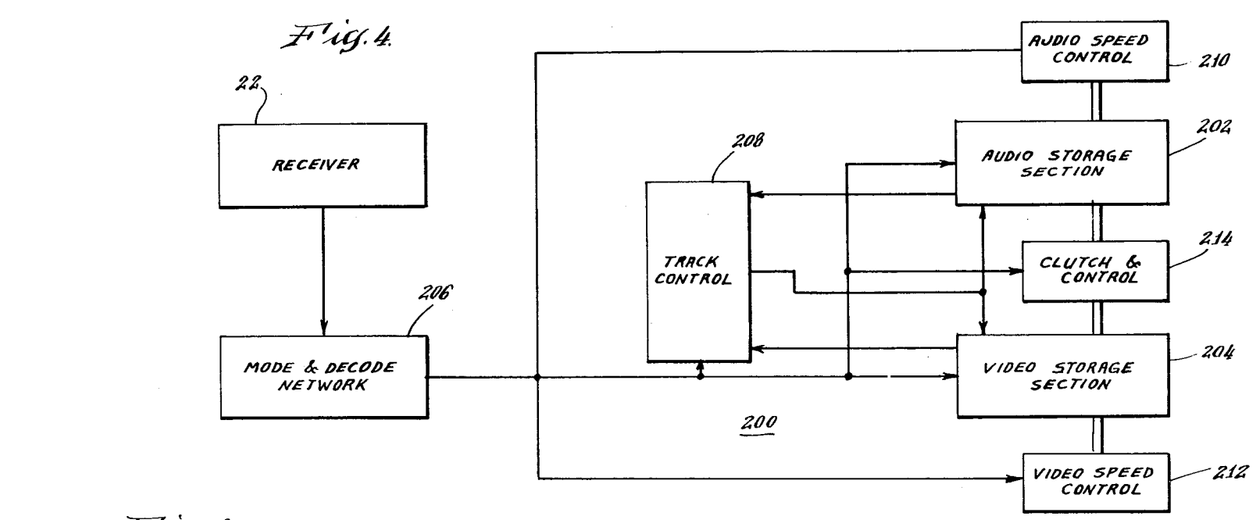
FIG. 4 is a block diagram of a second embodiment for a video recording and playback apparatus in accordance with the invention.
Figure 5:
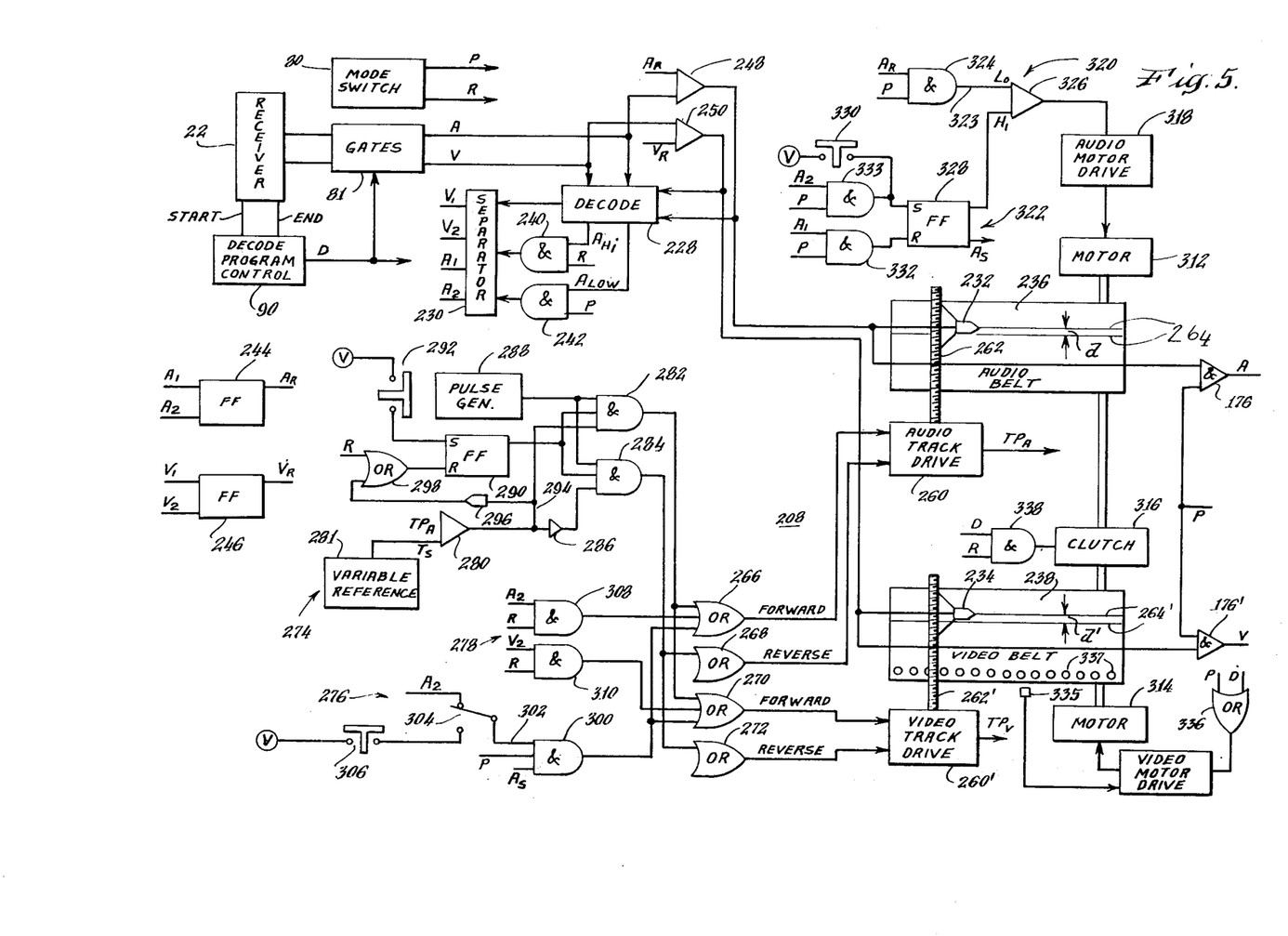
FIG. 5 is a more detailed schematic diagram of the system of FIG. 4.
Figure 6:
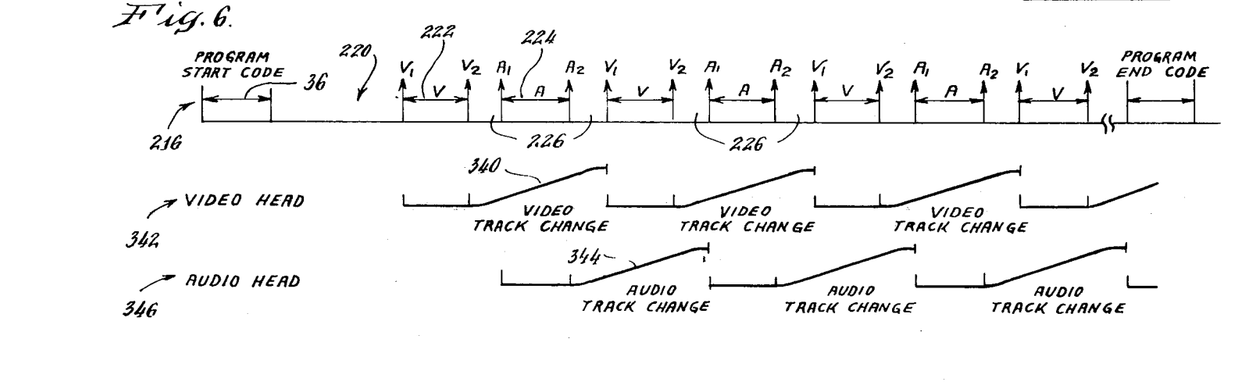
FIG. 6 is a waveform diagram of several signals developed in the apparatus of FIG. 4 and a schematic representation of the organization of audio and video signals during transmission of a program.

DETAILED DESCRIPTION OF EMBODIMENT OF FIGS 4, 5 and 6

With reference to FIG. 4, a block diagram is shown for an alternate embodiment of a program recorder and playback system 200. Apparatus 200 includes an audio storage section 202 and a video storage section 204 to respectively retain audio and video program signals detected by receiver 22. Each storage section includes a continuous tape loop of substantial belt width to accommodate a plurality of tracks.

The system 200 utilizes a receiver 22 such as described with reference to the embodiment in FIG. 2. Receiver 22 detects incoming program signals and a mode and decode control network 206 processes the signals for control of the recording and playback modes. A track control 208 is provided to sequence the audio and video heads. An audio speed control 210 provides the input drive for the audio storage belt during playback. A video speed control 212 provides the input drive for the video storage belt during playback and for both audio and video belts during recording. A clutch control 214 interconnects the audio storage section 202 and the video speed control 212 during the recording mode. Hence, with the clutch 214 both belts are operated at the same speeds and in synchronization with each other during the recording mode.

FIG. 5 illustrates system 200 in greater detail with several waveforms generated in the system being shown in FIG. 6. The program line 216 shown in FIG. 6 illustrates a program signal 218 formed of a start code 36 followed by a delay pause 200. Thereafter, video signals 222 and audio signals 224 appear in alternate sequence. Each video signal 222 is formed of conventional fm modulated video frame information which is flanked on both sides by pilot signals labeled $V_1$ and $V_2$ to respectively indicate the start and end of the video frame. A short pause 226 follows each video signal 222 to separate it from the audio signal 224. The audio signals are each flanked on both sides by pilot signals labeled $A_1$ and $A_2$ to respectively demote the limits of the audio signals 224.

Both video and audio signals 222 and 224 are transmitted at high carrier frequencies to fit within the conventional video frequency bands. The video signals are of 1/30 of a second duration as for a conventional frame and the audio signals also last for 1/30 of a second. The pauses 226 also last for 1/30 of a second. Hence, the transmission time alloted for each video frame and its associated audio narration is 1/10 of a second. An alternate composition of the transmitted video and audio frames would entail a sequential transmission of first of all of the video frames followed by all of the audio frames. Such alternate composition is more particularly described hereafter.

The pilot signals $V_1$, $V_2$, $A_1$ and $A_2$, are detected with a decode network 228 which supplies the decoded outputs to a separator circuit 230. The decode network 228 is connected to both the outputs from gates 81 and the outputs of heads 232, 234 to provide frame start and end pulses which correspond to $V_1$, $V_2$, $A_1$ and $A_2$. Decode network 228 further detects the frame start and end pulses $A_1$ and $A_2$ picked up by head 232 during the slower playback speed of the audio belt 236. Heads 232 and 234 operate respectively with audio tape belt 236 and a video tape belt 238. During the record mode, the higher frequency audio frame pulses are applied to separator circuit 230 through an AND gate 240. During playback, the lower frequency audio frame pulses are applied to separator circuit 230 through AND gate 252. Although audio head 232 is shown as a single head, it actually represents a high carrier frequency recording head for high belt speed audio frame recording and a low frequency playback head for low speed audio frame playback. THe use of a pair of heads enables the recording of audio frames at belt speeds of 500 inches per second with playback belt speeds of 1.8 inches per second.

The frame pulses $V_1$, $V_2$, $A_1$ and $A_2$ are applied to flip-flop 244 and 246 to generate frame signals $V_r$ and $A_r$ used to enable heads 234 and 232 respectively during the recording mode. This enabling function is obtained with logic operational amplifiers 248 and 250 connected between heads 232, 234 and gates 81.

During the recording mode, the video and audio signals V and A are connected to heads 232 and 234 to place each audio and video frame on a separate belt track. Each belt 236, 238 has sufficient width to accommodate a large number of parallel tracks of the order of 100. Hence, after each frame has been recorded, heads 232, 234 are sequenced to the next adjacent track by track control 208.

The track control network 208 includes an audio track drive 260 with a lead shaft 262 to support and advance audio head 232. Track drive 260 may include a geneva mechanism to rotate lead 262 in discrete segments corresponding to the distance between adjacent audio tracks 264. Similar track drive 260' is employed to sequence video head 234 to video tracks 264'. Each track drive 260, 260' produces a track position signal TP to indicate the actual position of heads 232, 234 relative to respective tracks 264, 264'.

The audio and video track drives 260–260' operate in forward and reverse directions in correspondence with pulses applied to their inputs from OR gates 266, 268, 270 and 272. The latter gates combine signals from several networks such as track selection circuit 274, a playback track advance circuit 276 and a record track advance circuit 278.

Track selection network 274 enables an operator to position the audio and video heads 232 and 234 over any desired track 264–264'. One of the track positions signals $TP_a$, from the audio track drive 260, is applied to a comparator 208 together with a track selection signal TS. This latter signal may be produced from a variable reference voltage source 281 representative of the desired track. The output of comparator 280 is applied to AND gate 282 directly and to AND gate 284 through an inverter 286. Hence, depending upon whether the output of comparator 280 is positive or negative, either one of AND gates 282 and 284 is enabled. Since the latter gates are respectively coupled to the forward OR gates 266, 270 and reverse OR gates 268, 272, the heads are driven to the desired or selected track represented by signal TS.

The pulse signals for moving heads 232, 234 from track selection network 274 initiate with a pulse generator 288 coupled to AND gates 282, 284. A flip-flop 290 is employed to actuate track selection circuit 274 by providing an additional enabling input to AND gates 282, 284. A normally open push button switch 292 produces a start signal which sets flip-flop 290 and thus enables AND gates 282, 284.

When the desired tracks 264–264' have been reached, the output line 294 of comparator 280 goes to a minimum value, which is detected by a threshold network 296, whose output is applied through an OR gate 298 to the reset input of flip-flop 290. The latter's reset terminates the control of track selection network 274.

With the aid of track selection network 274, the operation of the playback mode may be conveniently commenced at any track. If, for example, a lecture on a particular track was not fully understood, a repeat playback may be quickly implemented.

Once heads 232, 234 have been located over the desired tracks, further playback of successive tracks is under the control of circuit 276. This includes an AND gate 300 having its output coupled to forward OR gate 266 and 270 to advance heads 232, 234 to the next track. AND gate 300 is enabled by the play-back mode signal P and produces an output signal whenever the end of an audio narration occurs as evidenced by pulse $A_2$. The $A_2$ signal is applied to input 302 of AND gate 300 through a switch 304. When switch 304 is placed in its other position than as shown, it couples a signal produced by a normally open push-button switch 306 to input 302 for a manual track advance of heads 232, 234.

During the recording mode, track advance signals are generated by circuit 278. Both the $A_2$ and $V_2$ pilot signals, detected during the recording mode, are respectively applied through AND gates 208, 310 to forward OR gates 266 and 270. In this manner, the audio head 232 and video head 234 are alternately advanced to a successive track.

The movement of belts 236, 283 is obtained with audio motor 312, video motor 314 and a clutch 316 which is actuated to enable both belts 236, 238 to be driven by a signal motor 316 during the recording mode.

Audio motor 312 is controlled with a motor drive 318 which in turn is operated by a low speed control 320 and a high search speed control 322. The low speed control 320 produces a normal playback signal to operate audio belt 236 at the normal playback speed of about 1.8 inches per second. The low speed signal is generated by the output 323 of an AND gate 324 whose inputs are the playback mode signal P and the audio enable signals $A_r$ from flip-flop 244. Output 323 of AND gate 324 is applied to an operational amplifier 326 coupled to the audio motor drive 318.

The high speed control 322 for audio belt 236 enables one to quickly advance to the start of a frame. A flip-flop 328 provides an input signal to operational amplifier 326 causing a high drive speed of belt 236 upon being set for a signal from either a pushbutton switch 330 or an AND gate 333. When a belt position signal is generated from AND gate 332, flip-flop 328 is reset and the high speed drive of audio belt 236 is terminated. Note that during operation of high speed drive circuit 322, the output signal $A_s$, from flip-flop 328, inhibits any track advance pulses from AND gate 300 in playback track advance circuit 276.

During the recording mode, both the video belt 238 and audio belt 236 are driven by a common motor 314 under control by a video motor drive 334. The recording speed of motor 314 is carefully controlled as to speed and phase to place the splice of the belt at the beginning of a video frame. For this purpose a splice and video belt speed detector 335, such as an electrooptical sensor operator with properly spaced holes 337 in belt 238. The output signal from detector 335 is applied to the motor drive 334 for speed and phase control. The latter drive is energized by either the decoded program control signal D from network 90 or the playback mode signal P, both of which signals are applied to video motor drive 334 through an OR circuit 336. Clutch 316 is energized by the output of an AND gate 338 whose inputs are the record mode signal R and the decoded program control signal D. The clutch energization interconnects the audio belt 236 and video belt 238 which thus rotate at the same speed. Audio motor 312 is of the type that permits output shaft rotation by video motor 314 when clutch 316 interconnects belts 236 and 238.

In the operation of the recording and playback system of FIGS. 4 and 5, assume that a program of the type shown on line 216 in FIG. 6 is transmitted and received by receiver 22. The recording heads 232, 234 are initially located over starting tracks 264-264' and mode switch 80 is placed in the recording mode.

The program start code 36 is detected and signal D produced to enable gates 81, energize clutch 316 through AND gate 338 and commence the drive of video motor 314. Since the frequency of the signals into receiver 22 are very high, both belts are driven at a high recording speed to enable the recording of video signals at their normal frequency encountered in conventional television transmission.

Pause 220 as shown on line 216 in FIG. 3 is of sufficient duration to enable the belts 236, 238 to achieve their recording speed. When the first video pilot signal $V_1$ is detected, a flip-flop 246 is set and its output signal $V_r$ permits the input video signal V from gates 81 to pass logic amplifier 250 for recording on video belt 238.

Video belt 238 has such length that at its driven recording speed, all the video signals for one frame are recorded on one full track 264'. When the second video pilot signal $V_2$ has been detected, flip-flop 246 is reset and a pulse is applied to AND gate 310 to advance video head 234 to the next track 264'. This advance requires a certain amount of time as indicated by curve 340 on line 342 in FIG. 6. The track transfer, however, is completed before the next video pilot signal $V_1$ of the second arrives.

The detection of the first high frequency pilot signal $A_1$ sets flip-flop 244 whose output signal $A_r$ enables logic amplifier 248 for a recordation of the audio frame. The audio information is recorded with a much greater signal frequency and belt speed than what is needed during playback. Since playback of the audio narration will be of the order of 18 seconds, the increased recording speed provides a more efficient time utilization of the transmission channel.

At the end of the audio transmission, the detected high frequency audio pilot signal $A_2$ resets flip-flop 244 and provides a track advance pulse to AND gate 308 to move audio head 232 to the next track on audio belt 236. By the time the next audio frame arrives, the audio head 232 has completed its movement to the next track 264 as shown by curve 344 on line 346 of FIG. 6.

The above process of alternately recording of audio and video frames on individual tracks is continued automatically until the entire program has been recorded. The end of the program is identified by an end code which, upon detection by network 90, terminates the enabling signal D.

Note that the operation of the track advance of heads 232, 234 provides synchronous movement with the heads being held in fixed relationship with each other relative to belts 236 and 238. In this manner, the retrieval of a frame for playback maintains each video frame associated with its audio narration.

For playback mode, switch 80 is placed in the playback position and the heads 232, 234 positioned over the desired tracks. This involves actuation of pushbutton switch 292 after the desired frame is selected by setting the reference voltage from source 281. When the desired frame is being displayed, the beginning of the audio frame narration is quickly detected by actuation of the high speed control pushbutton 330 in network 322.

Display of video frame signals is obtained by passing the output signals from video head 234 through an analog logic amplifier 176' enabled by mode signal P. The video signals from amplifier 176' are demodulated and then applied to a conventional television receiver. The audio frame or narration signals from audio head 232 are applied through amplifier 176 and after demodulation to the audio section of the conventional television receiver.

At the end of an audio narration, the low frequency audio pilot signal $A_2$ is detected and produces a track transfer pulse from AND gate 300. This automatically advances both heads to the next track and places the audio head at the start of the next audio narration by enabling the high speed control circuit 322 with AND gate 333. When the start of the next audio frame is recognized, the low frequency audio pilot signal $A_1$ will cause an automatic termination of the high speed travel of audio belt 236. Note that this enables the recording of information without controlling where the start of the audio frame began or ended on a track.

The recording to audio and video information has been explained with reference to FIGS. 4 – 6 on the basis of alternate audio and video frames. An alternate composition of the transmitted signal would include the transmission of all video frames at 2/30 of a second intervals until, say a hundred frames, or even a single or a few, have been recorded. Each frame would still require 1/30 of a second to record with the remaining time period employed to advance video record head 234 to the next track.

At the end of the recording of all video frames the audio frames are recorded. A properly coded separation signal on the transmitted signal would signify the completion of the video frame transmission and this coded signal would be recognized to effect an automatic return of the audio and video heads to their starting positions. Upon return of the heads, the audio information frames would be recorded in the same manner as the video frames at 2/30 of a second intervals.

This method of recording would permit and maintain a more convenient synchronized relationship between the audio and video heads 232, 234 which would remain in fixed relationship with each other for a less mechanically complex head track control design.

Alternatively, the audio frames may be recorded by and while cycling both heads back, one track at a time, towards the starting track position. Since this approach requires a reverse drive capability, it may be less desirable even though elimination of the pause to allow heads 232, 234 to return to their starting positions would conserve transmission time.

In the event audio of extended time duration is to be transmitted, for example a concerto, the stepping action of the audio head may be replaced with a continuous conventional recording. The high carrier frequency of the audio signal or short recording time would enable a single transmitter to service a large number of requests.

The recording of the video frames on loops such as belts 238 in FIG. 5 is obtained with a precise control of belt speed. The belt motion is tightly locked in with the signal rate of the received video signals. Another method for obtaining tight speed control utilizes an optically detectable signal or magnetic signal of known frequency, e.g. 60 cycles located on the belt. This signal would be read out by an additional magnetic head if a magnetic signal or with a small light source and photo diode if the signal is optical in character. It is to be understood that erasure of recorded programs may be obtained with conventional well-known techniques. Furthermore, belts 232, 234 may be removably mounted to provide quick reinsertion of fresh belts. In this manner a library of books, courses and the like may be acquired and preserved.

Having thus described several embodiments for recording and playing back video frame signals with audio narration in accordance with the invention, its advantages may be understood. The double storage loops employed lend themselves conveniently to home reception of educational programs. For example, an art course may be transmitted wherein the video frames are pictures of art which are explained and discussed by the accompanying audio narration. The transmission of video information in real time provides efficient utilization of the transmission channel. The use of frame defining signals conveniently facillitates the recording and playback of video and audio signals. The video frame defining signals may be derived from the vertical synchronization pulses normally present in conventional composite frames displayed in home television receivers.

What is claimed is

1. An apparatus for playing back video still pcitures with associated audio for display and sound projection comprising
program storing means for storing video frames and associated audio frames;
a magnetic video frame storing loop having a track sized to store a still picture video frame;
means for recording on and playing back a video frame stored on said loop;
means for producing from the program storing means audio frame signals representative of audio associated with a video frame stored on said loop;
means for producing an audio end signal representative of the end of an audio frame associated with said stored video frame; and
means actuated by said audio end signal for transferring a video frame from said program storing means on said loop for playback with associated audio frame signals.

2. The apparatus for playing back video still pictures with associated audio as claimed in claim 1 wherein said means for recording on and playing back from said loop further includes
means for driving said loop at a first transfer speed for transferring a video frame to said loop from the program storing means and driving said loop at a second higher playback loop speed selected commensurate with the loop speed needed to provided playback of video frames compatible for video display.

3. A method for transmitting, receiving and displaying still picture video programs comprising the steps of
transmitting a composite signal formed of a pluralitu of video frames and audio frames respectively associated with the video frames;
recording the composite signal on a magnetic medium;
playing back the recorded magnetic medium to generate audio frames and associated video frames therefrom;
transferring video frames being played back from the magnetic medium for storage on a magnetic loop; and
playing back the video frame stored on said loop for simultaneous display thereof with the projection of the associated audio frame being played back from the magnetic medium.

4. The method as claimed in claim 3 wherein the recording step further includes recording of the composite signal on the magnetic medium at a high recording speed thereof and wherein the audio frames are played back from the magnetic medium at a reduced playback speed thereof.

5. An apparatus for playing back video and associated audio signals for display and sound projection on a conventional television receiver comprising
a cassette of magnetic tape carrying video frame signals and audio frame signals in preselected order to associate each audio frame with a video frame, said video frame signals being flanked by video pilot signals and the audio frame signals being each terminated with an audio pilot signal;
means for playing back signals from the cassette of magnetic tape;
means for detecting the video pilot signals and producing a video start signal and a video end signal respectively representative of the beginning and end of a video frame;
means for detecting the audio pilot signal to produce an audio end signal indicative of the end of an audio frame;
means including a magnetic video frame storing loop for recording and playing back on said video loop;
means initiated by the audio end signal and controlled by the video start and end signals for transferring video frames from the cassette of magnetic tape to the video loop; and means for driving said cassette and video loop at respective audio producing and video display speeds for audio projection and visual frame display on the conventional television receiver.

6. The playback apparatus as claimed in claim 5 wherein the driving means further includes means actuated by the audio end signal for operating the video frame storage loop at a transfer speed selected to fit a video frame or whole multiple thereof precisely on the loop, and means actuated by the video end signal for commencing the video display speed of the video frame storing loop.

7. The playback apparatus as claimed in claim 6 and further including means actuated by the audio end pulse for inhibiting the display of video signals for the duration of the transfer operation of said transferring means.

8. The playback apparatus as claimed in claim 7 wherein said inhibiting means is formed of a blanking pulse generator coupled to the audio end pulse for generating a blanking pulse having a duration selected commensurate with the time period for transferring video frames from the cassette tape to the video loop and for the video loop to achieve the video display speed upon completion of said transfer.

9. The playback apparatus as claimed in claim 8 and further including means responsive to the blanking pulse for inhibiting the projection of the audio frame signal for the duration of said blanking pulse.

10. An apparatus for recording and playing back video and associated audio signals for display and sound projection on a television display comprising means for receiving an input signal carrying a program formed of a plurality of video frames and associated audio frames and a program identifying code;

means responsive to the input signal for identifying a desired program code and producing a gate signal indicative thereof;

means actuated by the gate signal for passing the desired program of video and audio frames for playback;

means including a magnetic storage medium for recording and playing back video and audio frames therewith, with the video frames being recorded on the magnetic medium with a predetermined time relationship with respect to associated audio frames;

means for moving the magnetic storage medium at a first high operating speed to record audio frames and at a second low operating speed for playback of the audio frames;

a magnetic video frame storage loop having a length selected to produce video frame signals for frame display on a conventional television receiver upon continuous rotation of the loop;

means for producing video start and video end signals respectively indicative of the beginning and end of a video frame;

means for sensing audio pilot signals recorded on the magnetic medium along with the audio frames to identify an audio frame and producing an audio end signal indicative of the end of the audio frame;

means actuated by said audio end signal for storing a video frame on said loop in synchronism with the video start and video end signals; and means responsive to the audio end signal for initiating the playback of an audio frame associated with said stored video frame.

11. The apparatus for recording and playing back video and associated signals as claimed in claim 10 and further including means for driving said loop into a first low recording speed and a second high playback speed selected to provide video frame signals for display on a conventional television receiver.

* * * * *

UNITED STATES PATENT AND TRADEMARK OFFICE
CERTIFICATE OF CORRECTION

PATENT NO. : 4,045,819
DATED : August 30, 1977
INVENTOR(S) : Peter C. Goldmark

It is certified that error appears in the above-identified patent and that said Letters Patent are hereby corrected as shown below:

Column 2, line 51, "to" should be --of--.
Column 3, line 32, "from" first occurence should be --frame--.
Column 4, line 68, "O" should be --P--.
Column 5, line 44, "$V^!_I$" should be --$V^!_T$--.
Column 7, line 1, "demote" should be --denote--;
line 35, "THe" should be --The--.
Column 8, line 54, "208" should be --308--;
line 61, "signal" should be --single--.
Column 9, line 2, "signals" should be --signal--.
Column 12, line 26, "pluralitu" should be --plurality--.

Signed and Sealed this

Third Day of January 1978

[SEAL]

Attest:

RUTH C. MASON
*Attesting Officer*

LUTRELLE F. PARKER
*Acting Commissioner of Patents and Trademarks*